(12) United States Patent
Mehendale et al.

(10) Patent No.: US 8,140,248 B2
(45) Date of Patent: Mar. 20, 2012

(54) SYSTEM AND METHOD FOR OBTAINING AN OPTIMAL ESTIMATE OF NOX EMISSIONS

(75) Inventors: Charudatta Subhash Mehendale, Niskayuna, NY (US); Gordon Raymond Smith, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 527 days.

(21) Appl. No.: 12/419,382

(22) Filed: Apr. 7, 2009

(65) Prior Publication Data

US 2010/0251699 A1    Oct. 7, 2010

(51) Int. Cl.
  *G06F 19/00* (2011.01)
(52) U.S. Cl. .......................... 701/114; 123/672; 60/274
(58) Field of Classification Search .................. 701/103, 701/109, 114; 123/672, 679; 60/277, 286, 60/274, 276, 295, 297, 301, 303
See application file for complete search history.

(56) References Cited

U.S. PATENT DOCUMENTS

| | | | |
|---|---|---|---|
| 5,099,647 A | | 3/1992 | Hamburg |
| 5,929,700 A | | 7/1999 | Fuller et al. |
| 6,125,629 A | * | 10/2000 | Patchett .......................... 60/286 |
| 7,124,013 B2 | * | 10/2006 | Yasui .............................. 701/103 |
| 7,610,750 B2 | * | 11/2009 | Viola et al. ........................ 60/286 |
| 7,647,157 B2 | * | 1/2010 | Yasui .............................. 701/103 |
| 7,784,272 B2 | * | 8/2010 | Song et al. ........................ 60/286 |
| 2004/0128982 A1 | * | 7/2004 | Patchett et al. .................. 60/274 |
| 2007/0239365 A1 | | 10/2007 | Hanson et al. |

OTHER PUBLICATIONS

"Measuring Aircraft Gas Turbine Engine Fine Fuel Filter Element Performance";Document No. ARP1827Revision No. A; Date Published: May 2003; Issuing Committee: Ae-5b Engine Related Components Airframe-Mounted Pumps; Available from Internet:<http://www.sae.org/technical/standards/ARP1827A>; 24 pages.

Robert B Caldwell Jr.; "Investigation Into the Tumbling Characteristicsof the Tier III Minus Unmanned Air Vehicle (UAV)"; Abstract available from Internet:<http://www.nps.edu/Research/ThesisAbst/ThesisWinter98/PM%20MAR98%20MS%20AERO%20ENG.pdf> 1 page.

* cited by examiner

*Primary Examiner* — John Kwon
(74) *Attorney, Agent, or Firm* — Richard A. DeCristofaro

(57) ABSTRACT

A control system for providing an optimal estimate of NOx emission in an exhaust during a selective catalytic reduction process is provided. The control system includes a continuous emission monitoring sensor configured to generate a responsive signal representing a first estimate of NOx emission; wherein the responsive signal has a first time lag between a time of measurement of NOx emission and the time when the corresponding responsive signal is made available by the continuous emission monitoring sensor, and the continuous emission monitoring sensor has a first time constant. The control system also includes a virtual sensor configured to generate a relatively faster responsive signal representing a second estimate of NOx emission. The control system further includes a processor that includes a time delay compensation circuit configured to introduce a second time lag in the relatively faster responsive signal, wherein the second time lag matches the first time lag. The processor also includes a low pass filter circuit coupled to the time delay compensating circuit, wherein the low pass filter circuit has a second time constant matching the first time constant to generate a time delayed signal representing a third estimate of NOx emission. The processor is further configured to subtract the time delayed signal from the summation of the responsive signal and the relatively faster responsive signal to generate the optimal estimate of the NOx emission, wherein the optimal estimate is fed as a feedforward signal into an injection system in the selective catalytic reduction process.

15 Claims, 4 Drawing Sheets

SYSTEM AND METHOD FOR OBTAINING AN OPTIMAL ESTIMATE OF NOX EMISSIONS

BACKGROUND

The invention relates generally to systems for monitoring NOx emissions, and more particularly to systems for obtaining an optimal estimate of the emissions.

Public awareness has increased with respect to the environment, and primary pollutants such as nitrogen oxides and sulfur dioxide are currently regulated in most industries. A great deal of attention in recent years has been spent on addressing the monitoring requirements of these regulations, in order to minimize the discharge of noxious gases into the atmosphere by industrial facilities.

One technique for ensuring correct monitoring of NOx has been to implement continuous emissions monitoring systems (CEMS). A CEM system typically includes a gas analyzer installed either directly in the exhaust stack, or connected via an extractive system which extracts a gas sample from the exhaust stack and conveys it to an analyzer at grade level. Continuous emissions monitoring systems are quite expensive, particularly due to the installation cost and demanding maintenance and calibration requirements of the gas analyzers.

In order to target the challenges associated with CEMS, solutions have been developed that do away with the gas analyzer and instead uses a computer based model for predicting the NOx emissions. The model uses as input a number of monitored parameters from the energy or fuel conversion process, such as temperatures and pressures. These systems are referred to as predictive or parametric emissions measurement systems (PEMS).

There have been PEMS built in the past to predict various combustion and emission parameters from continuous industrial processes and to calculate process or combustion efficiency for compliance reporting and process optimization purposes. Typically, the PEMS is "trained" by monitoring multiple inputs such as pressures, temperatures, flow rates, etc., and one or more output parameters such as, but not limited to, NOx and carbon monoxide. After training, in normal operation, the PEMS monitors only the multiple inputs and calculates estimated output parameter values that closely match the actual pollutant levels. Methodologies used in the past include nonlinear statistical, neural network, eigenvalue, stochastic, and other methods of processing the input parameters from available field devices and to predict process emission rates and combustion or process efficiency. However, the PEMS are complicated, relatively costly, and difficult to implement. The systems also typically require retraining with the support of specialized staff from the system provider to adjust the proprietary model to the real-world conditions encountered in the field.

Therefore, an improved system for obtaining an optimal estimate of NOx emissions is desirable to address one or more of the aforementioned issues.

BRIEF DESCRIPTION

A control system for providing an optimal estimate of NOx emission in an exhaust during a selective catalytic reduction process is provided. The control system includes a continuous emission monitoring sensor configured to generate a responsive signal representing a first estimate of NOx emission; wherein the responsive signal has a first time lag between a time of measurement of NOx emission and the time when the corresponding responsive signal is made available by the continuous emission monitoring sensor, and the continuous emission monitoring sensor has a first time constant. The control system also includes a virtual sensor configured to generate a relatively faster responsive signal representing a second estimate of NOx emission. The control system further includes a processor that includes a time delay compensation circuit configured to introduce a second time lag in the relatively faster responsive signal, wherein the second time lag matches the first time lag. The processor also includes a low pass filter circuit coupled to the time delay compensating circuit, wherein the low pass filter circuit has a second time constant matching the first time constant to generate a time delayed signal representing a third estimate of NOx emission. The processor is further configured to subtract the time delayed signal from the summation of the responsive signal and the relatively faster responsive signal to generate the optimal estimate of the NOx emission, wherein the optimal estimate is fed as a feedforward signal into an injection system in the selective catalytic reduction process.

A method for providing an optimal estimate of NOx emission in an exhaust during a selective catalytic reduction process is provided. The method includes generating a responsive signal representing a first estimate of NOx emission via a continuous emission monitoring sensor; the responsive signal comprising a first time lag and the continuous emission monitoring sensor comprising a first time constant. The method also includes generating a relatively faster responsive signal representing a second estimate of NOx emission via a virtual sensor. The method further includes introducing a second time lag in the relatively faster responsive signal via a time delay compensation circuit; the second time lag matching the first time lag. The method also includes generating a time delayed signal representing a third estimate of NOx emission via a low pass filter circuit coupled to the time delay compensation circuit, the low pass filter circuit including a second time constant matching the first time constant. The method also includes subtracting the time delayed signal from a summation of the responsive signal and the relatively faster responsive signal via a processor to generate the optimal estimate of the NOx emission, wherein the optimal estimate is fed as a feedforward signal into an injection system in the selective catalytic reduction process.

A method for generating an accurate control signal is provided. The method includes receiving a first input signal via a first sensor; the first input signal characterized by a first time lag and the first sensor comprising a first time constant. The method also includes receiving a second input signal via a second sensor; the second input signal characterized by zero time lag. The method further includes introducing a second time delay in the second input signal, wherein the second time delay matches the first time delay. The method also includes transmitting the second input signal with the second time delay via a low pass filter, wherein the low pass filter includes a second time constant, and the second time constant matches the first time constant. The method further includes subtracting the time delayed signal output via the low pass filter, from a summation of the first input signal and the second input signal to generate the accurate control signal, wherein the accurate control signal is fed as a feedforward signal into an injection system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention include a system and method for obtaining an optimal estimate of NOx emissions. The system and method include a technique to introduce a time delay in a relatively faster, responsive signal and filter the signal via a low pass filter. As used herein, the term 'NOx emission' includes emission of gases such as, but not limited to, nitrogen oxide and nitrogen dioxide.

Figure 1:
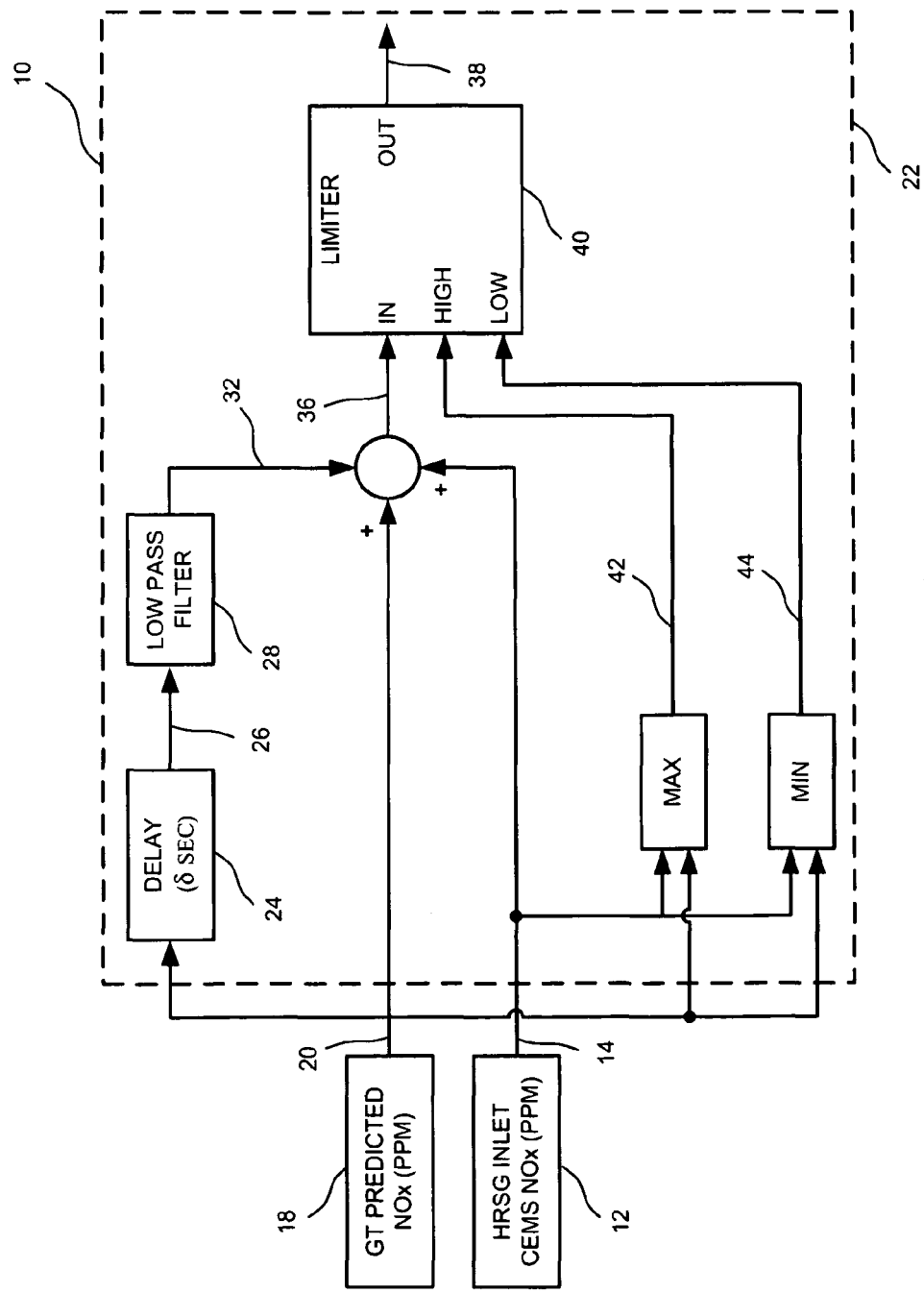
FIG. 1 is a schematic illustration of a control system for providing an optimal estimate of NOx emission in an exhaust during a selective catalytic reduction process in accordance with an embodiment of the invention.

FIG. 1 is a schematic illustration of a control system 10 for obtaining an optimal estimate of NOx emissions in an exhaust during a selective catalytic reduction process. The system 10 includes a continuous emission monitoring sensor (CEMS) 12 having a first time constant to generate a responsive signal 14 representing a first estimate of NOx emission. In a particular embodiment, the first time constant includes a range between about 60 seconds to about 180 seconds. The responsive signal 14 has a first time lag between a time of measurement of NOx emission and the time when the corresponding responsive signal is made available by the CEMS sensor 12. The first time lag typically occurs due to a transportation period and processing time of a sample in the exhaust. In one embodiment, the first time lag is greater than about 45 seconds.

A virtual sensor 18 generates a relatively faster, responsive signal 20 representing a second estimate of NOx emission. The term 'relatively faster' refers to a faster response time as compared to the responsive signal 14. The relatively faster, responsive signal is considered relatively inaccurate compared to the responsive signal 14. In a particular embodiment, the second estimate is determined based upon a model reflecting a predetermined relationship between control parameters and NOx emissions, wherein the control parameters include ambient humidity, manifold pressure, manifold temperature, fuel rate, and engine speed associated with an engine, for example. Furthermore, the model may be adjusted based on a determination of whether the predicted NOx values meet predetermined criteria associated with actual NOx values measured. In another embodiment, the model or the virtual sensor may be associated with a neural network that accepts determined control parameters as inputs and produces a predicted NOx value as an output.

Furthermore, a processor 22 including a time delay compensation circuit 24 introduces a second time lag in the relatively faster, responsive signal 20 resulting in signal 26, wherein the second time lag in the signal 26 is equal to the first time lag in the responsive signal 14. A low pass filter circuit 28 having a second time constant matching the first time constant is coupled to the time delay compensation circuit 24 to generate an additional time delayed signal 32 representing a third estimate of NOx emission. In one embodiment, the low pass filter circuit 28 is a first order low pass filter circuit. The signal 32 is subtracted from a sum of the responsive signal 14 and the relatively faster, responsive signal 20 to output a signal 36. In effect, the signal 32 removes contribution of the relatively inaccurate component from the relatively faster, responsive signal 20. In a steady state, the third component completely cancels contribution of the second component and the resulting estimate is the accurate first component referring to the responsive signal 14.

In one embodiment, logic of obtaining signal 36 representing an accurate estimate of NOx emission has similarities to a Smith Predictor control algorithm. The Smith Predictor control algorithm is often employed in feedback control of systems having "dead times." In such a scheme, the outer feedback control loop feeds the output back to the input, as usual. However, this loop alone would not provide satisfactory control, because of the delay; this loop is feeding back outdated information. Intuitively, for the time during which no fresh information is available, the system is controlled by the inner feedback loop which contains a predictor of what the (unobservable) output of the plant currently is. Accordingly, a Smith-Predictor like algorithm is appropriate for use herein, because there are time delays involved in obtaining an optimal estimate. Applying a lag and a low pass filter to the faster responsive signal generates a 'prediction' of the CEMS NOx signal. The invention is distinct from the typical Smith Predictor control algorithm in that accurate estimate of NOx emissions is generated for the purposes of feedforward control instead of feedback control.

A limiter 40 further receives the signal 36 to ensure that magnitude of an output signal 38 is maintained within a certain range. A maximum value 42 and a minimum value 44 of the responsive signals 14 and the relatively faster, responsive signals 20 are computed respectively. The maximum value 42 and the minimum value 44 are further fed into the limiter 40. The limiter 40, thus, limits the input signal 36 between the maximum value 42 and the minimum value 44. In a particular embodiment, the optimal estimate is fed as a feedforward signal for an injection system of a gas, for example, ammonia, in the selective catalytic reduction process. In another embodiment, the selective catalytic reduction process is performed in a power plant. It should be noted that although two sensors have been illustrated here, any number of sensors may be employed.

It should be noted that embodiments of the invention are not limited to any particular processor for performing the processing tasks of the invention. The term "processor," as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of the invention, as will be understood by those skilled in the art.

Figure 2:
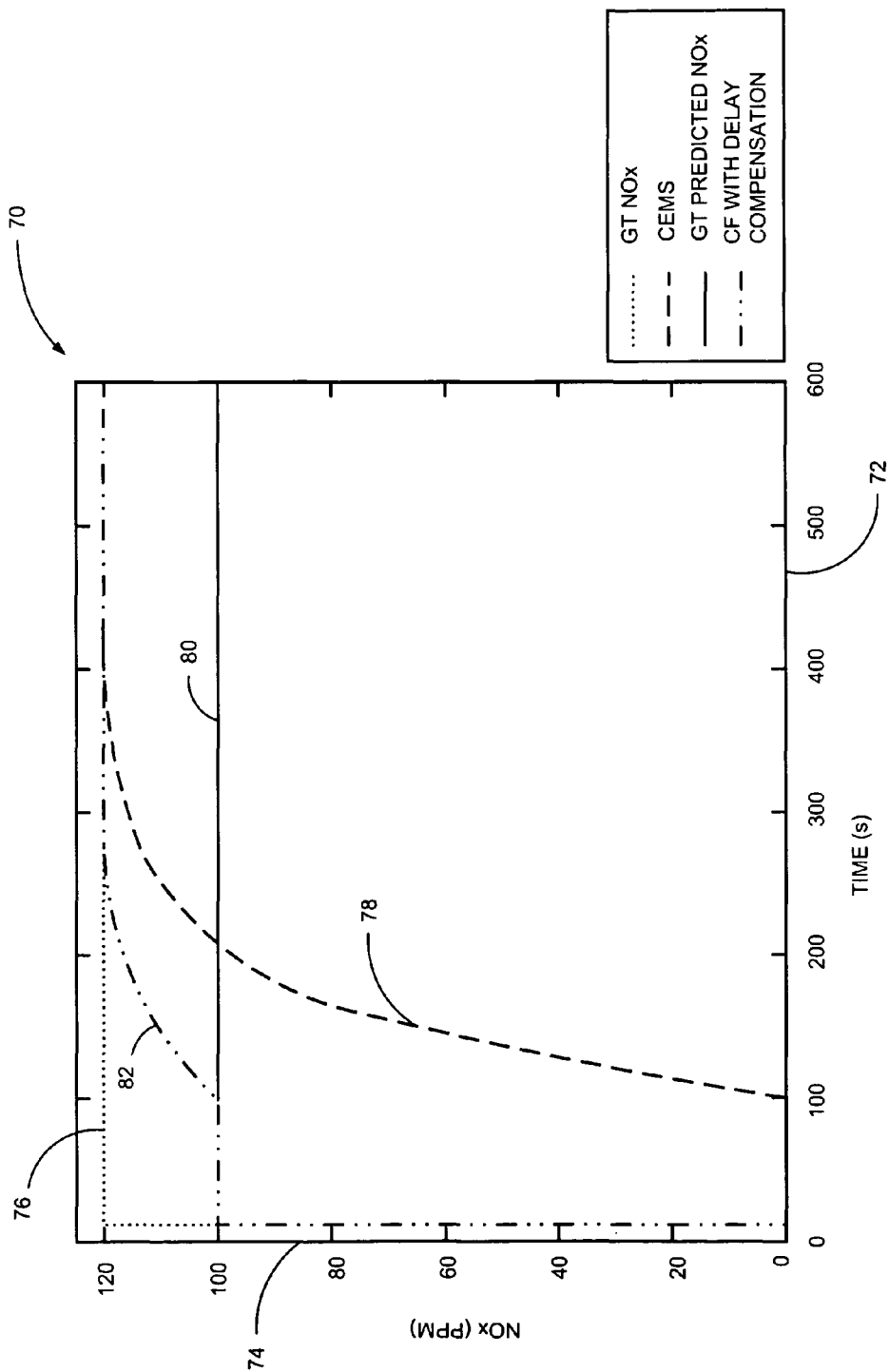
FIG. 2 is a graphical comparison of simulated results for optimal estimates of NOx emissions obtained via a CEMS sensor, a virtual sensor, and the control system in FIG. 1.

FIG. 2 is a graphical comparison 70 of simulated results for optimal estimates of NOX emissions obtained via a CEMS sensor, a virtual sensor, and the control system 10 in FIG. 1 for a time range of about 600 sec. The X-axis 72 represents time in seconds and the Y-axis 74 represents estimate of NOx emission in ppm (parts per million). As illustrated herein, curve 76 represents an actual estimate of NOx emission. The actual estimate rises as a step function from an initial value of to a steady state of 120 ppm. Curve 78 represents an estimate of NOx emission from a CEMS. The estimate varies from an initial value of 0 ppm for about 100 sec to reach a steady state of about 120 ppm after about 400 sec. Similarly, curve 80 represents an estimate of NOx emission obtained from a virtual sensor. The estimate rises as a step function from an initial value of 0 ppm to a steady value of 100 ppm. Furthermore, the curve 82 represents an estimate of NOx emission measured from the control system 10 in FIG. 1. As illustrated herein, the signal remains at 100 ppm for about 100 sec and further increases rapidly to reach a steady value of the actual estimate of 120 ppm at around 200 sec.

Figure 3:
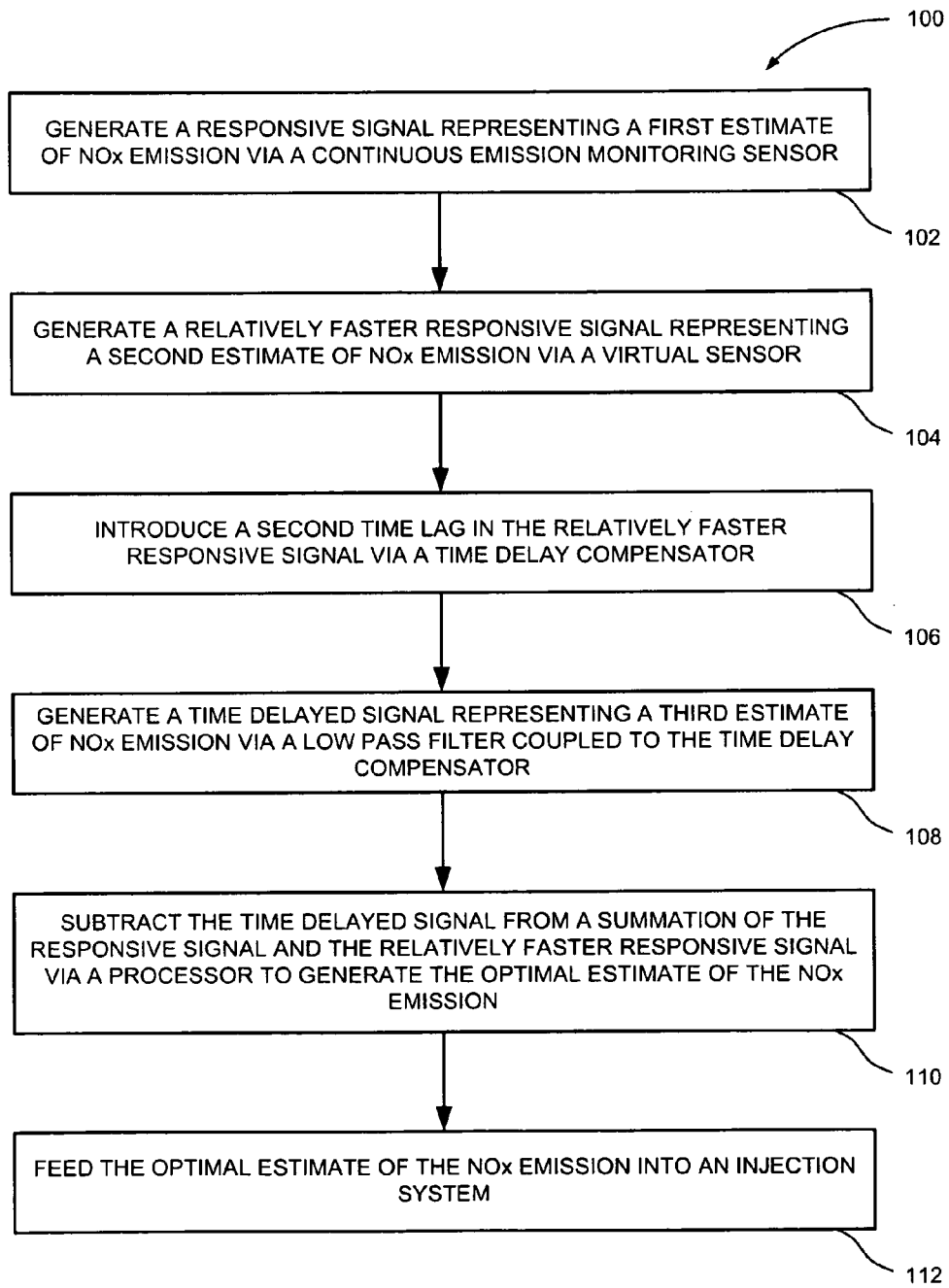
FIG. 3 is a flow chart representing steps in a method for providing an optimal estimate of NOx emission in an exhaust during a selective catalytic reduction process in accordance with an embodiment of the invention.

FIG. 3 is a flow chart representing steps in a method 100 for providing an optimal estimate of NOx emission in an exhaust during a selective catalytic reduction process. The method 100 includes generating a responsive signal representing a first estimate of NOx emission via a continuous emission monitoring sensor; wherein the responsive signal includes a first time lag and the continuous emission monitoring sensor includes a first time constant in step 102. A relatively faster responsive signal representing a second estimate of NOx emission is generated via a virtual sensor in step 104. In a particular embodiment, the steps 102 and 104 are performed simultaneously. A second time lag is introduced in the relatively faster responsive signal via a time delay compensation circuit; wherein the second time lag matches the first time lag in step 106. A time delayed signal representing a third estimate of NOx emission is generated in step 108 via a low pass filter circuit coupled to the time delay compensation circuit, wherein the low pass filter circuit includes a second time constant matching the first time constant. The time delayed signal is subtracted from a summation of the responsive signal and the relatively faster responsive signal via a processor to generate the optimal estimate of the NOx emission in step 110. The optimal estimate of the NOx emission is fed into an injection system in the selective catalytic reduction process in step 112.

Figure 4:
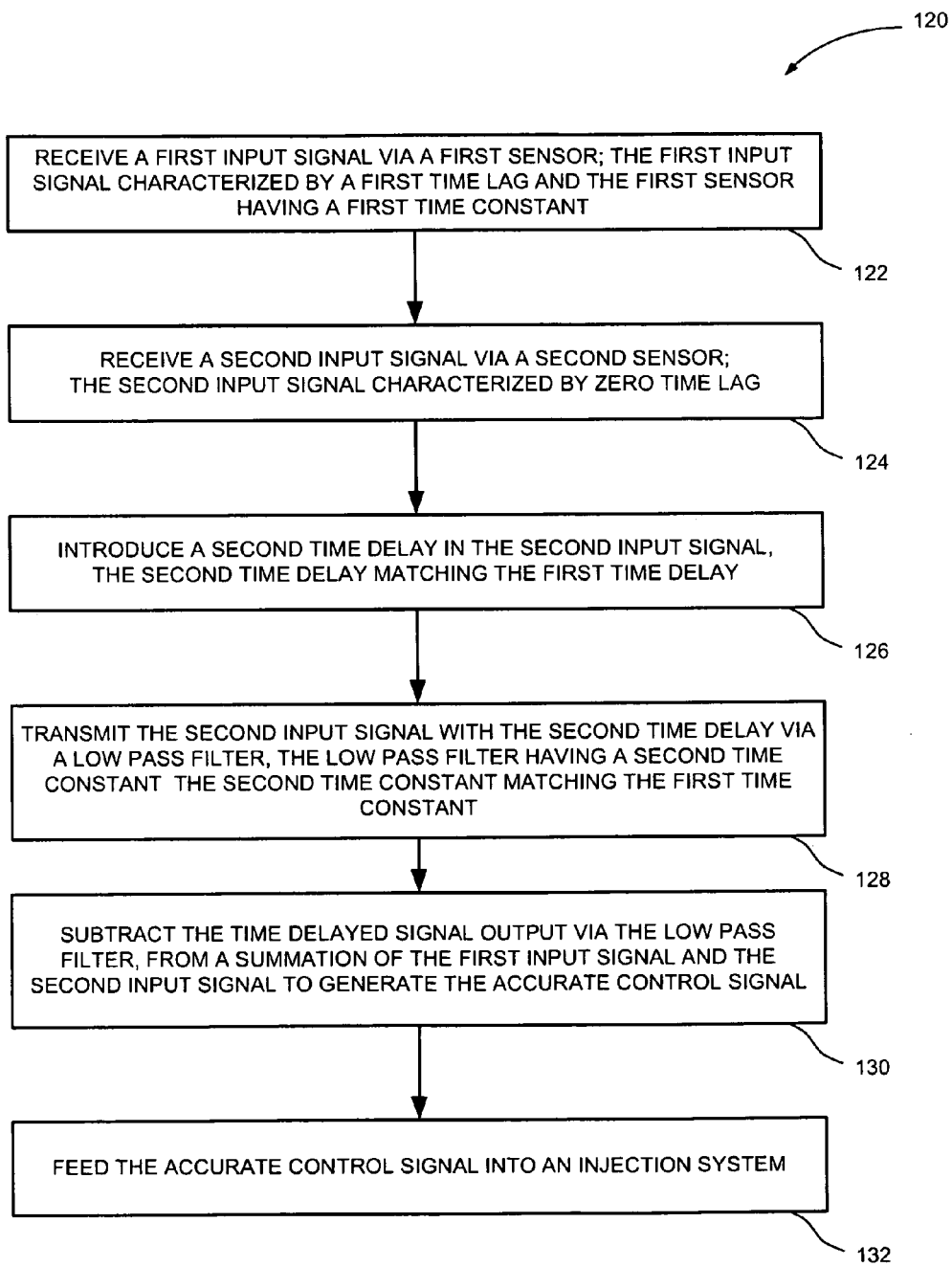
FIG. 4 is a flow chart representing steps in a method for generating an accurate signal in accordance with an embodiment of the invention.

FIG. 4 is a flow chart representing steps in a method 120 for generating an accurate signal. The method 120 includes receiving a first input signal via a first sensor; the first input signal characterized by a first time lag and the first sensor having a first time constant in step 122. In one embodiment, the first sensor includes continuous emission monitoring sensor. A second input signal is received via a second sensor in step 124, wherein the second input signal is characterized by zero time lag. In a particular embodiment, the second sensor includes a virtual sensor. A second time delay is introduced in the second input signal in step 126, wherein the second time delay matches the first time delay. The second input signal is transmitted with the second time delay via a low pass filter in step 128, wherein the low pass filter includes a second time constant that matches the first time constant. In one embodiment, the low pass filter is a first order low pass filter. The time delayed signal output via the low pass filter is subtracted from a summation of the first input signal and the second input signal to generate the accurate control signal in step 130. In one embodiment, the time delayed signal output is subtracted via a processor. The accurate control signal is further fed into an injection system in step 132.

The various embodiments of a system and method for obtaining an optimal estimate for NOx emissions described above thus provide a way to achieve a convenient and efficient means for determining amount of fluid to be injected in a selective catalytic reduction process. The system and method also enable maintaining and regulating amount of NOx emitted below an acceptable level. Further, the system and technique also allows for cost effective means for estimating NOx.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of a first order low pass filter described with respect to one embodiment can be adapted for use with a control system employing more than two sensors described with respect to another. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A control system for providing an optimal estimate of NOx emission in an exhaust during a selective catalytic reduction process, the control system comprising:
   a continuous emission monitoring sensor configured to generate a responsive signal representing a first estimate of NOx emission; the responsive signal having a first time lag between a time of measurement of NOx emission and the time when the corresponding responsive signal is made available by the continuous emission monitoring sensor, and the continuous emission monitoring sensor having a first time constant;
   a virtual sensor configured to generate a relatively faster responsive signal representing a second estimate of NOx emission; and
   a processor comprising:
   a time delay compensation circuit configured to introduce a second time lag in the relatively faster responsive signal, the second time lag matching the first time lag;
   a low pass filter circuit coupled to the time delay compensating circuit, the low pass filter circuit having a second time constant matching the first time constant to generate a time delayed signal representing a third estimate of NOx emission; the processor further configured to subtract the time delayed signal from the summation of the responsive signal and the relatively faster responsive signal to generate the optimal estimate of the NOx emission, wherein the optimal estimate is fed as a feedforward signal into an injection system in the selective catalytic reduction process.

2. The system of claim 1, wherein the NOx emission comprises nitrogen oxide and nitrogen dioxide.

3. The system of claim 1, wherein the optimal estimate is fed as a feedforward signal for an injection system of a gas in the selective catalytic reduction process.

4. The system of claim 3, wherein the gas comprises ammonia.

5. The system of claim 1, wherein the processor comprises a Smith predictor like algorithm.

6. The system of claim 1, wherein the selective catalytic reduction process is performed in a power plant.

7. The system of claim 1, wherein the first time lag comprises a time greater than about 45 seconds.

8. The system of claim 1, wherein the first time constant comprises a range between about 60 seconds to about 180 seconds.

9. The system of claim 1, wherein the first time lag occurs due to transportation period and processing time of sample in the exhaust.

10. A method for providing an optimal estimate of NOx emission in an exhaust during a selective catalytic reduction process, the method comprising:
    generating a responsive signal representing a first estimate of NOx emission via a continuous emission monitoring sensor; the responsive signal comprising a first time lag and the continuous emission monitoring sensor having a first time constant;
    generating a relatively faster responsive signal representing a second estimate of NOx emission via a virtual sensor;
    introducing a second time lag in the relatively faster responsive signal via a time delay compensation circuit; the second time lag matching the first time lag;
    generating a time delayed signal representing a third estimate of NOx emission via a low pass filter circuit coupled to the time delay compensation circuit, the low pass filter circuit having a second time constant matching the first time constant;
    subtracting the time delayed signal from a summation of the responsive signal and the relatively faster responsive signal via a processor to generate the optimal estimate of the NOx emission; and
    feeding the optimal estimate of the NOx emission into an injection system in the selective catalytic reduction process.

11. The method of claim 10, wherein the first time constant comprises a range between about 60 seconds to about 180 seconds.

12. The method of claim 10, wherein the second time constant comprises a range between about 60 seconds to about 180 seconds.

13. A method for generating an accurate control signal comprising:
    receiving a first input signal via a first sensor; the first input signal characterized by a first time lag and the first sensor comprising a first time constant;
    receiving a second input signal via a second sensor; the second input signal characterized by zero time lag;
    introducing a second time delay in the second input signal, the second time delay matching the first time delay;
    transmitting the second input signal with the second time delay via a low pass filter, the low pass filter comprising a second time constant, the second time constant matching the first time constant; and
    subtracting the time delayed signal output via the low pass filter, from a summation of the first input signal and the second input signal to generate the accurate control signal; and
    feeding the accurate control signal into an injection system.

14. The method of claim 13, wherein the first sensor comprises a continuous emission monitoring sensor.

15. The method of claim 11, wherein said subtracting comprises subtracting via a processor.

* * * * *